Figure 1:
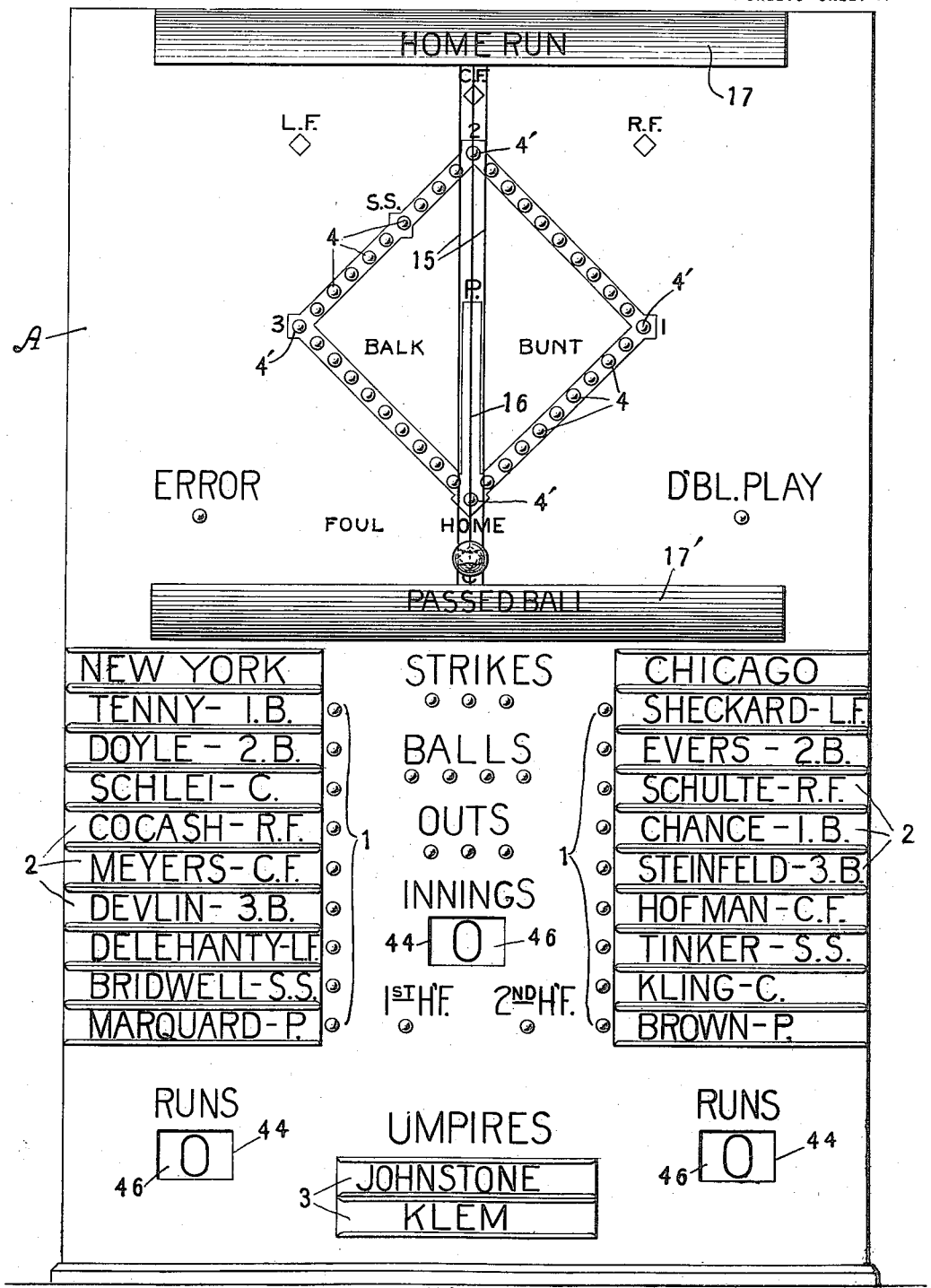

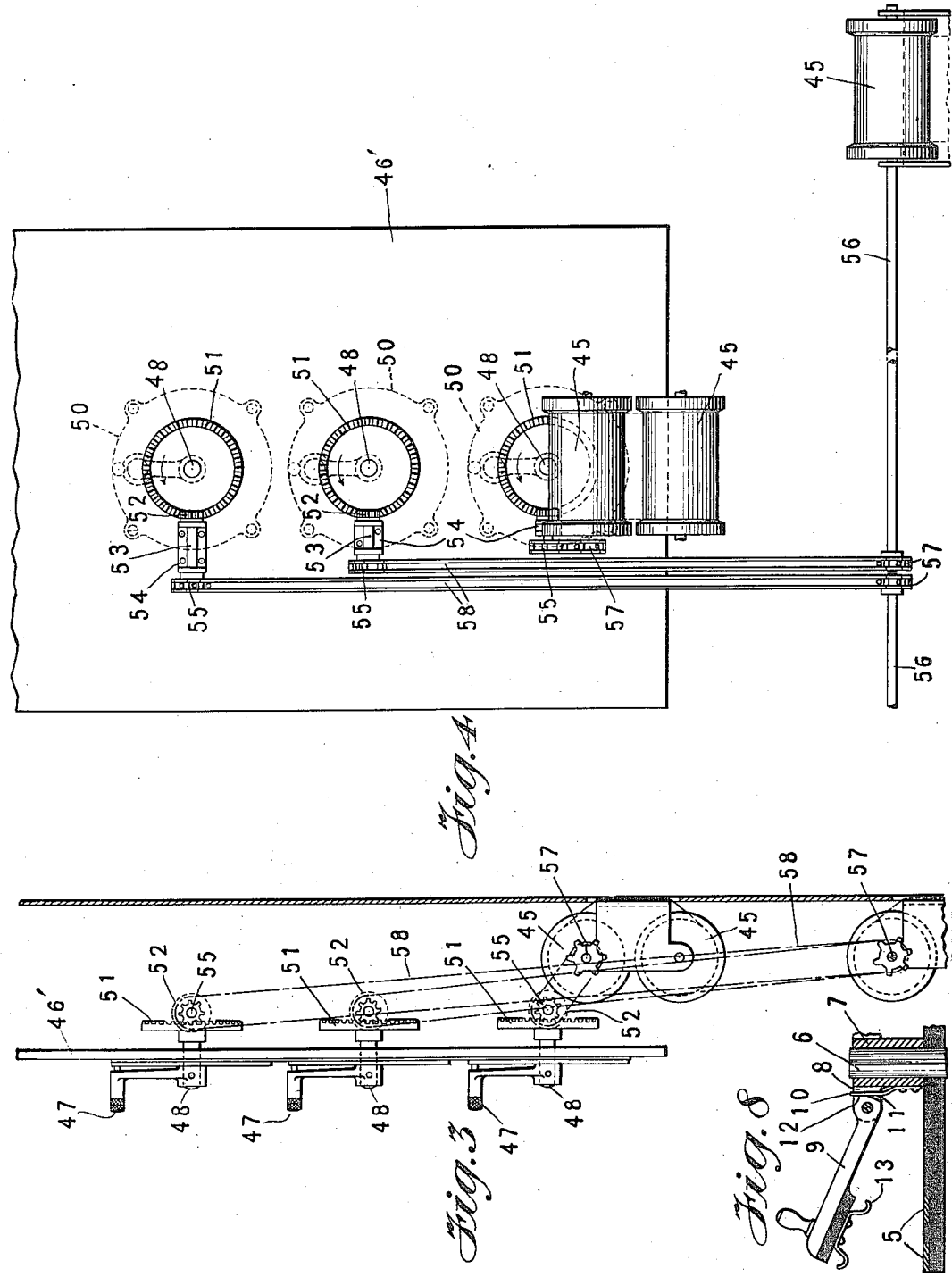

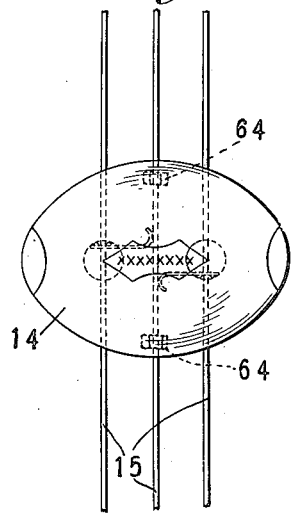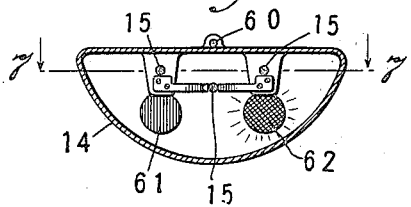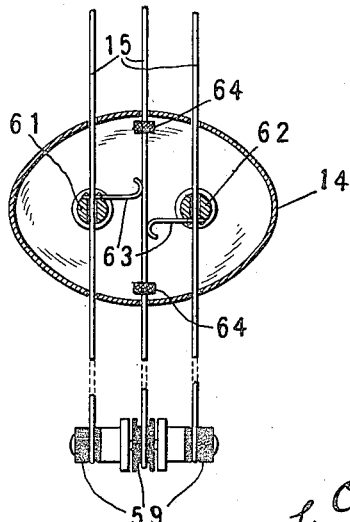

UNITED STATES PATENT OFFICE.

CHARLES H. WILSON, OF NEW YORK, N. Y., ASSIGNOR, BY MESNE ASSIGNMENTS, TO MABEL CRANE BAKER, OF STAMFORD, CONNECTICUT.

APPARATUS FOR GRAPHICALLY PORTRAYING GAMES OR OTHER EVENTS.

1,193,745.   Specification of Letters Patent.   Patented Aug. 8, 1916.

Application filed April 12, 1909, Serial No. 489,546. Renewed January 8, 1916. Serial No. 71,128.

*To all whom it may concern:*

Be it known that I, CHARLES H. WILSON, residing at New York city, in the county of New York and State of New York, have invented certain new and useful Improvements in Apparatus for Graphically Portraying Games or other Events, of which the following is a specification.

This invention relates broadly to means for communicating news to the public, and more particularly to improvements in devices such as bulletin boards.

The present invention provides a device for reproducing the progress of athletic events of any character, such as baseball, football, cricket, foot, horse or automobile races, or in fact any event wherein it is desired to portray the relative positions and travels of persons or objects, or the progress and position of players in a game, or the progress and position of an object of play such as a baseball or football.

One of the objects contemplated by the present invention is to provide apparatus of the above character which will accurately reproduce each feature of any event of the above general nature, in such manner as will enable the public or those to whose view the device is exposed to readily understand and follow the same.

Another object is to provide in combination with an appropriate field, of the nature of that employed in a particular game to be reproduced an object such as a ball or disk, which may, through means substantially invisible to the audience, be shifted to any part of the field in coincidence with the actual movement of the ball or other object used in a game or with the actual movements of competitors engaged in the particular game reproduced.

A further object is to provide a device of the above character which will occupy a minimum amount of space wherever employed, and which may be more conveniently operated than have devices of this general character as heretofore constructed, the end in view having been in certain respects directed to the production of improved apparatus over that described and for consummating the objects and advantages mentioned in my application for Letters Patent of the United States filed February 26, 1908, Serial Number 417,804.

Another object is to provide electrical means with the appropriate connections therefor whereby certain other features of the contest reproduced, and more particularly the movements or positions of other factors therein, may be conveniently and accurately indicated; and whereby, in athletic events wherein it is desirable at certain times and for certain intervals to vary the significance of a moving factor, variations in the appearance of such factor may, if desired, be conveniently controlled.

Other objects and uses will be in part obvious and in part pointed out hereinafter.

The invention accordingly consists in the features of construction, combinations of elements and arrangements of parts which will be exemplified in the description hereinafter set forth, and the scope of the application of which will be indicated in the following claims.

Figure 2:
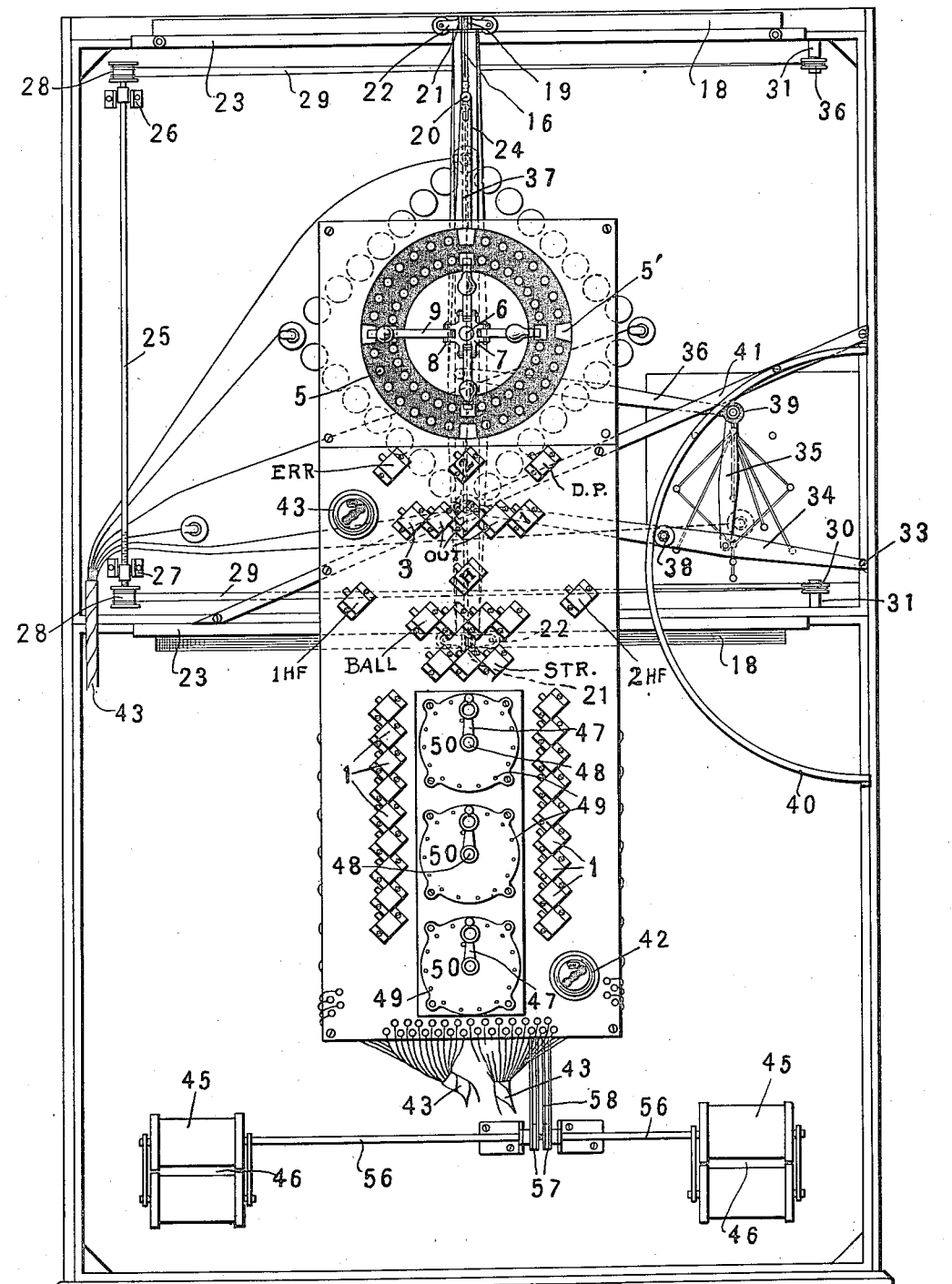

In the accompanying drawings, wherein is shown one of the various possible embodiments of my invention: Figure 1 is a view in front elevation of a device constructed in accordance with one of the various possible embodiments of my invention; Fig. 2 is a view in rear elevation of the herein-disclosed embodiment of my invention; Fig. 3 is a view in side elevation, partly in section, of the mechanism for operating certain number or symbol-bearing webs and rolls; Fig. 4 is a view in front elevation of such mechanism; Fig. 5 is an illustration of a method of mounting a device representing a football, whereby the same may carry with it a plurality of electric-light bulbs adapted to be controlled irrespective of the quiescence or travel of said device; Fig. 6 is a sectional view of such device; Fig. 7 is a view in rear elevation of such device; Fig. 8 is a view, partly in section, of one of the bridging levers described hereinafter.

Similar reference characters refer to similar parts throughout the several views of the drawings.

Referring now particularly to the embodiment of this invention disclosed in Figs. 1, 2, 3, 4 and 8 I have shown the same as adapted to reproduce a baseball game, and in Figs. 5, 6 and 7 I have shown a possible method of mounting the disk which represents the object of play in a football game were that game desired to be reproduced by the invention herein disclosed. Having now reference to the construction shown in Figs. 1, 2, 3, 4 and 8, A represents a wall which may be constructed in the nature of a bulletin board, the outer surface of which carries the representation of a baseball field. This field, as will be observed, has the various positions occupied by the players appropriately designated by words, letters, numerals or other characters. In the present instance, in addition to the characters which are appropriately designative of the various positions occupied by the players, I have provided upon the board various stationary signals which, in the present instance, are constituted by incandescent electric lamps, the circuits of which are controlled by the operator, who preferably occupies a position behind the board. These signals operate singly or in combination with other signals to indicate all reproduced plays or other features of a game, as will hereinafter be explained.

The lights designated "strikes" may be employed to designate the number of strikes thrown by a pitcher to a batsman of the opposing team; the lights designated "balls" similarly indicate the number of balls thrown to said batsman, and the lights designated "out" may be employed to indicate the number of players upon the team at bat that have been declared out by the umpire. The lights marked "error" and "double play" indicate when lighted each of these respective plays, and the lights marked "1st hf" and "2nd hf" individually indicate when lighted that the 1st or 2nd half of a particular "inning" is being played. A row of lamps 1 is also shown as extending parallel to each of group of slides 2, provided to receive interchangeable cards to indicate the "teams" and "batting orders", and these lamps are adapted to indicate by their luminosity those players "at bat" and "on base". It will of course be understood that the name most advanced in the "batting order" which is illuminated will, from the nature of the progression of the game, be the man at bat, and that those names above him which are illuminated will of necessity indicate those players on base. These various lamps are adapted to be controlled by the operator from switches similarly marked, an illustrative arrangement of these switches being shown in Fig. 2.

I also provide slides 3 as shown, wherein may be inserted placards or cards bearing the name or names of the person or persons engaged in umpiring the game.

In this embodiment of my invention I provide a series of lamps 4, extending from base to base and coinciding with the outline of the diamond; and also a switching device adapted to light these lamps progressively to indicate the progress of a player from base to base around the diamond, which device, through appropriate wiring therefor, and which is not here shown, maintains the progressive lighting of the lamps 4 conveniently within reach of the operator. Lamps 4' of this series are controlled separately by the individual switches marked "1", "2", "3" and "H" (Fig. 2), as well as by said switching device, and thus one or several of said lamps 4' may be kept illuminated, irrespective of the "break" of the switching device mentioned, and thereby indicate that one or more of the base positions are occupied after the progression of the player from base to base. Referring now to Fig. 2, wherein is shown an illustrative embodiment of the switching device mentioned, there is provided a series of separated contacts 5, arranged circumferentially of the center spindle 6, which spindle is properly mounted for rotation. Spindle 6 carries a sleeve 7, fixedly mounted thereon, which sleeve is provided with a plurality of forked extensions 8, in this embodiment four in number, wherein are pivoted bridging members 9 as shown. Each of these bridging members is provided with a knob as shown whereby it may be raised or lowered, respectively, into inoperative or operative relation to said contacts. It will be noticed that I have arranged contacts 5', which correspond respectively to the base positions and which control the lamps located at those positions, as of greater amplitude than the other contacts in the series, in order that the passing of a bridging member thereover will cause a relatively longer illumination of said base-position lamps than the successive individual illuminations of the other lamps in the series 4.

The operation of the switching device just described is exceedingly simple. Thus, if a "home-run" be scored, the bridging member extending downwardly (Fig. 2) is lowered to operative position by means of its knob, and said switching device is rotated one complete revolution, causing the lamps 4 to become successively illuminated in a complete circuit of the diamond. Assume a man on first base and that he "steals" to second base: The bridging member extending to the right (Fig. 2) is lowered to operative position by means of its knob, and said switching device is rotated a quarter revolution, thereby causing lamps 4 between first and second bases to become successively illuminated. Assume a "double steal," say a man stealing from first to second base and from third base to the "home-plate": The bridging member extending to the right (Fig. 2) is lowered to operative position by means of its knob, the bridging member extending to the left (Fig. 2) is lowered to operative position by means of its knob, and said switching device is rotated a quarter revolution, thereby causing lamps 4 between first and second bases to become successively illuminated simultaneously with the successive illumination of lamps 4 between third base and home-plate. It will thus be seen that I have provided a device of great simplicity and ease of operation, applicable to all possible "base-running" situations; and that the same is always ready for immediate actuation, as it is obvious that it makes no difference in which directions the respective bridging members extend, provided they individually cover a contact 5'. In Fig. 8 I have shown a detailed view of a method of mounting bridging members 9 upon spindle 6, whereby, on account of the play of leaf-spring 10 against faces 11 and 12, said bridging member will have a tendency to remain fixed in either operative or inoperative position. A possible method of mounting a contacting brush 13 or the like is also shown in this figure.

Supported adjacent the field and moved by means hereinafter described is a movable signal which, in the present instance, is constituted by an object formed in simulation of a baseball. This object is indicated at 14, and is shown as resting over the catcher's position, ready to be moved to any portion of the field in correspondence with the movement of the ball upon the actual playing field, and thus reproduce in combination with the field and stationary signals the play upon the actual playing field. The movable signal will be preferably painted or otherwise colored in contrast with the field so as to be readily distinguishable from a great distance.

In the present instance the movable signal 14 is shown as supported upon supporting members 15, and is adapted to travel lengthwise thereof when pulled in either direction by member 16, which latter member is shown as passing (Fig. 1) behind hoods 17 and 17', thence (Fig. 2) through slots 18 and over pulleys 19, and thence to block 20, wherein both ends of said member 16 are fastened. Supporting members 15 extend behind hoods 17 and 17' and terminate at 21 in trucks 22 which are adapted to ride on tracks 23 for horizontal travel. Connecting trucks 22 is a vertically-disposed rigid carriage 24, so formed as to provide a longitudinal slot therein as shown for the travel along its length of block 20. Trucks 22 and their connecting carriage 24 will hereinafter be referred to as carriage 24 and considered as one element. It will thus be seen that if block 20 is moved downwardly, signal 14, by virtue of the substantially endless connecting member 16, will move upwardly; and if block 20 is moved upwardly, signal 14 will move downwardly. It will also be seen that if carriage 24 is moved bodily to the right or left, it will carry with it signal 14 to the right or left. It naturally follows that any conceivable movement over the outside field may be given to said signal 14 by combinations of these movements.

In order to maintain parallelism of movement of carriage 24 and to avoid the binding of trucks 22 on tracks 23, I have provided mechanism which may be used in connection with this embodiment of my invention. I show a spindle 25 mounted for rotation in brackets 26 and 27, the latter of which is screw-threaded to accommodate the screw-threads shown on spindle 25. Fixedly mounted at each terminus of said spindle is a drum 28, on each of which is partially wound a flexible connection 29, extending horizontally across the back of the board and thence around drums 30 journaled on studs 31. It will of course be understood that other mountings for the drums are possible, as for instance the mounting of drums 30 on a single spindle similar to spindle 25. One strand of each of said connections 29 is connected to the adjacent terminus of the carriage 24, so that if one end of carriage 24 moves to the right or left, it will cause spindle 25 to rotate and cause a corresponding feed of both connections 29, thereby causing said carriage 24 to travel parallelly. The screw-threads on spindle 25 and in bracket 27 above-described tend to cause said drums to slightly rise or descend during rotation to promote regular windings thereon of said connections 29.

In order to promote efficiency of operation, I have, instead of showing block 20 as operable directly, shown additional mechanism which may be used in connection with this embodiment of my invention. I provide a set of multiplying or pantograph levers, one end of which system terminates in block 20, said system playing over a miniature field 32. This system is shown as pivoted to the rear wall as at 33, and is comprised by levers 34, 35, 36 and 37. Lever 37 is pivotally connected to block 20, lever 34 carries a trolley 38, and levers 35 and 36 at their meeting point carry an operating knob 39 and a pointer or indicator therebeneath for travel over said miniature field. I have shown certain frequent travels of said indicator over said miniature field as being formed by grooves or mutilations, which act in the nature of a guide therefor. Inasmuch as trolley 38 moves in a fixed arc, irrespective of the various operations of the system of levers, I have provided a circular track 40 therefor, which is shown as being braced by means of strut 41. It will thus be seen that the slightest actuation of the knob 39 will cause a corresponding and proportional movement of said signal 14, and that all possible movements of the projectile object of play may be conveniently reproduced on the large outside field. By the simple movement of the signal 14 to appropriate parts of the field, a "balk", "bunt", "foul", "sacrifice", "attempted steal", "home-run" (by the signal passing under any part of hood 17) or "passed ball" (by the signal passing under any part of the hood 17') may be shown. In combination with the appropriate lamps, "foul-strikes", "balls", "errors", "doubleplays", etc., may be shown. A "fly", "fumble" or "assisted put-out" may be clearly shown. Thus, if the ball is batted to left field and is caught on the fly, the following operation takes place: signal 14 travels from the pitcher to the "plate", thence to left field, and before it is returned by left field to the pitcher an "out" lamp is lighted. If the ball is fumbled, it travels as before to left field, shunts around that position a few times, but before it travels to first base or elsewhere the batter progresses to first base and the base lamp thereon becomes lighted, as also does the lamp opposite the batter's name below. In the case of an "assisted put-out", the signal travels as before to left field and thence to first base, but not until after it leaves left field is the "out" lamp lighted. It is of course to be understood that the above method of indicating various plays is merely illustrative.

In order to simplify the control of the various lamps on the face of the board, I have provided switching means which may be used in connection with this embodiment of my invention. I provide a master switch 42 which is adapted to throw on or off the current for the entire board, and a sub-master switch 43, which is adapted to likewise have subsidiary control over the current for the lamps pertaining to the individual player, such as the "strikes" and "balls" lamps. The system of master and sub-master switches as herein disclosed is of course merely illustrative. Although the appropriate wiring for the lamps is not here shown in its complexity, certain of the wires I have indicated as passing into conduits 43'.

In order to conveniently display the "runs" and indicate the "inning", I have disposed certain mechanism behind apertures 44 in this illustrative embodiment of my invention. Behind each of these apertures is mounted a pair of drums 45, carrying a webbing 46, suitably delineated with appropriate numbers, devices or symbols. These drums are here shown as operated from the switchboard 46', by means of indicators 47, mounted for rotation on spindles 48 journaled in said switchboard for rotation, which indicators, coacting with properly-marked stops positioned as at 49 on dials 50, are adapted through the mechanism now to be described to cause the various numbers, symbols or devices on said webbings to be displayed as desired. Adverting to said intermediate mechanism, a portion of which is shown in Fig. 2, reference is now made to Figs. 3 and 4. It will be seen that I have shown the top dial in Fig. 2 as controlling one of the "runs" webbings, the middle dial as controlling the other of the "runs" webbings, and the bottom dial as controlling the "innings" webbing. Fixedly mounted on each of said spindles 48 and adapted to rotate therewith, I have shown a crown-gear 51, with which meshes a spur-gear 52 which, on its shaft 53 mounted in bracket 54, carries a sprocket 55. On the center shaft 56 of each upper drum 45 of the three sets of drums mentioned I have shown fixedly mounted a sprocket 57; and connecting sprockets 55 and 57 I have shown suitable sprocket-chains 58. It will accordingly be seen that an actuation of any indicator 47, in coaction with its stops as at 49, will, through the proper adjustment of sprocket-chains 58, cause any desired number, device or symbol to be displayed through any of said apertures 44.

Referring now to Figs. 5, 6 and 7, I have shown in detail a possible method of mounting signal 14, in such a manner that it may acquire different significances during quiescence or travel. While in this embodiment I have shown the signal as being formed in simulation of a football, such varying significance, for instance, indicating by its characteristic the side which "has the ball", it would perhaps be as equally desirable in reproducing other events, such as baseball, for instance, where the changing significance might indicate by its characteristic which team is "in the field." Adverting to the mechanism disclosed, I have shown in enlarged detail supporting members 15 connected to insulated members 59 (which members correspond in location to the portions 21 of trucks 22); and also a member 60 for pulling the signal in either direction along supporting members 15, member 60 being shown as an equivalent element for pulling-member 16 in Figs. 1, 2, 3, 4 and 8. Within signal 14, which may be composed of some translucent material, are a plurality of suitably-mounted electric-light bulbs 61 and 62 of different color, both of which are constantly in contact with two of members 15 as shown, by means of members 15 disposed exteriorly passing through their bases and by means of interior member 15 passing between fingers 63. Within signal 14 and on center member 15 I have shown nuts or restraining bosses 64. It will therefore be seen that no matter what position said signal occupies on supporting members 15, through the actuation of pulling member 60, it will always maintain bulbs 61 and 62 in contact with some two of said members; and it should be obvious that the illumination of said bulbs is conveniently controlled by maintaining in center member 15, through the proper leads, a current of one potentiality, and by maintaining in either of outer members 15 a current of the other potentiality, whereby, through ordinary switching means (not here shown), a circuit may be created with reference to either bulb 61 or bulb 62.

Having thus described the construction of this embodiment of this invention, the operation thereof, which should to a large extent be obvious, may now be understood.

The progress of any game or event may be indicated or portrayed by mechanism constructed in accordance with the present invention in various ways, which will of course vary with the character of the game or other event which is being reproduced. In the present embodiment, it will be understood the travel or position of the ball on the field will be controlled by the knob 39, and the other factors by means of the switching and controlling devices arranged on the back of the board, all of which are shown as disposed within convenient reach of the operator, who will be in telegraphic or telephonic communication with an observer of the actual game being played. It will be seen that the operation of the entire mechanism may conveniently be accomplished by one operator, and it has been shown that all various possible combinations of plays may be reproduced.

While I have shown a system of pantograph levers for effecting the movement of the signal over the field, it will be understood that mechanism of other types may be employed in this relation without departing from the spirit or scope of the present invention, and that the herein described mechanism may be differently arranged or supported upon the board. It would be possible also to interchange the factorial significance of the movable signal, the located signals and the progressive bulb-illuminations. It will be obvious that the herein described mechanism is possessed of great adaptability and may be employed singly or in combination with other similarly constructed organizations to portray a great variety of events. Thus, by substituting road maps for the ballfield or other field an automobile race may be accurately portrayed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which as a matter of language, might be said to fall therebetween.

Having described my invention, what I claim as new and desire to secure by Letters Patent is:

1. In a ball game bulletin, the combination of a substantially unbroken surface adapted to have delineated thereon a ball field, a lighted ball adapted to move indiscriminately to any portion of the field including the unbroken surface, and means operable at a point removed from the front surface of the board for moving the ball.

2. In a bulletin board, the combination of a board having thereon a field representation, a movably mounted lighted signal comprising a member of translucent material adapted to represent a ball, conductors projecting across the field, means for moving the member along the conductors, and a plurality of electrical lighting devices adapted to show through said member, the respective lighting devices in said member having distinguishing characteristics.

3. In a bulletin board, the combination of a board having thereon a field representation, a movably mounted lighted signal comprising a member of translucent material adapted to represent a ball, means for moving the member over the field, said means taking the form of electrical conductors, and a plurality of devices lighted from said conductors adapted to show through said member, and means for operating one of said lights or both together.

4. In a ball bulletin, the combination of a surface having a field representation thereon, longitudinally extending guide members projecting across the field and mounted for movement, an electric lamp mounted on the guide members for independent movement, and said guides forming electric conducting means for said lamp.

5. In a ball bulletin board, the combination of a surface having a field representation, a plurality of series of electric lamps adapted to show at the front of the field, an annular series of electric contacts arranged at a point removed from the field, electric connections between the contacts and lamps, and a plurality of contact arms independently movable into and out of contact with the annular series of contacts.

6. In a ball bulletin board, the combination of a surface having a field representation, a plurality of series of electric lamps adapted to show at the front of the field, an annular series of electric contacts arranged at a point removed from the field, electric connections between the contacts and lamps, a plurality of contact arms independently movable into and out of contact with the annular series of contacts, and a common carrying member for said contact arms.

7. In a ball bulletin, the combination of a board having a field representation, a plurality of series of lights adapted to show at the front surface of the field and to indicate progressively, an annular series of electric contacts arranged at a point removed from the field representation, electric connections between said contacts and a plurality of contact arms, a supporting stem arranged substantially centrally of said annular series of contacts, and a sleeve on said supporting stem connected with said contact arms, the contact arms being movable into and out of operative position relative to the annular series of contacts.

8. In a ball bulletin, the combination of a board having a field representation, a plurality of series of lights adapted to show at the front surface of the field and to indicate progressively, an annular series of electric contacts arranged at a point removed from the field representation, electric connections between said contacts and a plurality of said lights, a plurality of contact arms, a supporting stem arranged substantially centrally of said annular series of contacts, and a sleeve on said supporting stem connected with said contact arms, the contact arms being movable into and out of operative position relative to the annular series of contacts, and means for holding the arms normally out of contact with said annular series of contacts.

9. In a ball bulletin board, the combination of a board having a field representation thereon, a plurality of series of electric lights arranged between the base positions and a light at each of the base positions, an annular series of contacts positioned on the board, electric connections between said contacts and said lights, the contacts of the annular series in electrical connection with the lights at the base position being elongated, and a contact arm for rotary movement whereby to move over the annular series of contacts in succession.

10. A ball bulletin board, the combination of a board having a field representation thereon, a plurality of series of electric lights arranged between the base positions and a light at each of the base positions, an annular series of contacts positioned on the board, electric connections between said contacts and said lights, the contacts of the annular series in electrical connection with the lights at the base position being elongated, and a contact arm mounted for rotary movement whereby to move over the annular series of contacts in succession, and said contact arm having independent movement into and out of contacting position, with means for normally holding the same in one of its last mentioned positions.

11. In apparatus of the class described, in combination, a member carrying the representation of a field, a signal freely movable over said field, supporting means for said signal, a movable carriage for supporting said supporting means, guiding means for said carriage, a plurality of spindles mounted for rotation, drums fixedly mounted at the termini of said spindles, connections between said drums and the termini of said movable carriage adapted to maintain said carriage to maintain parallelism of movement, a traveling device mounted in said carriage for endwise movement, and a member connecting said signal and said traveling device.

12. In apparatus of the class described, a member carrying the representation of a field, a signal movable over said field, supporting means for said signal, a movable carriage for supporting said supporting means, guiding means for said carriage, a plurality of spindles mounted for rotation, drums fixedly mounted at the termini of said spindles, connections between said drums and the termini of said movable carriage adapted to compel said carriage to maintain parallelism of movement, a traveling device mounted in said carriage for movement, and a member connecting said signal and said traveling device.

13. In apparatus of the class described, in combination, a member carrying the representation of a field, a signal freely movable over said field, relatively rigid supporting means for said signal, a movable carriage for supporting said supporting means, guiding means for said carriage, a plurality of spindles mounted for rotation, drums fixedly mounted at the termini of said spindles, connections between said drums and the termini of said movable carriage adapted to compel said carriage to maintain parallelism of movement, a traveling device mounted in said carriage for endwise travel therein, and a flexible member connecting said signal and said traveling device.

14. In apparatus of the class described, in combination, a member carrying the representation of a field, a signal freely movable over said field, supporting means for said signal, a movable carriage for supporting said supporting means, guiding means for said carriage, means adapted to compel said carriage to travel in parallelism, a traveling device mounted in said carriage for movement, a member connecting said signal and said traveling device, a field similar to the field first mentioned, means connected to said traveling device having another portion thereof adapted to travel over said last-mentioned field, and a plurality of arbitrarily disposed signals certain of which are comprised by a traveling webbing whose travel is controlled from a distance.

15. In apparatus of the class described, a member carrying the representation of a field, electric signals disposed thereon singly and in series, in combination with a plurality of switching members for actuating said individual signals and a switching member for actuating progressively the units of one or more of said series independently or simultaneously, said second-mentioned switching member being adapted to have a greater amplitude of contact for actuating certain of said signals.

16. In apparatus of the class described, a member carrying the representation of a field, electric signals disposed thereon singly and in series, in combination with a plurality of switching members for actuating said individual signals and a switching member for actuating progressively the units of one or more of said series independently or simultaneously, said second-mentioned switching member being adapted to have a greater amplitude of contact for actuating certain of said signals and certain of said first-mentioned switching members being adapted to control independently of the second-mentioned switching member certain units of the series.

17. In apparatus of the class described, in combination, a member carrying the representation of a field, electric signals disposed thereon singly or in series, a plurality of switching members for actuating said individual signals, and a switching member for actuating progressively the units of one or more of said series independently of other series or simultaneously with other series and comprising a plurality of separated contacts arranged circumferentially, different arcs of said circumference corresponding to different series of signals on said field, a spindle mounted for rotation at a point concentric of said circumference, and a plurality of contact-bridging members pivotally mounted on said spindle for make-or-break adjustment preliminary to rotation.

18. In apparatus of the class described, in combination, a member carrying the representation of a field, electric signals disposed thereon in groupings, and a switching member for actuating progressively the units of one or more of said groupings independently of other groupings or simultaneously with other series and comprising a plurality of separated contacts arranged circumferentially, different arcs of said circumference corresponding to different groupings on said field, a spindle mounted for rotation at a point concentric of said circumference, and a plurality of contact-bridging members pivotally mounted on said spindle for make-and-break adjustment preliminary to rotation.

19. In apparatus of the class described, a member, carrying a representation of a field of contest, a movable device comprising a plurality of electrical signals, a supporting device therefor comprising a plurality of current-conducting members, and actuating means for causing the travel of said movable device to any portion of said field, said current-conducting members being adapted to supply a current to either of said signals respective of the travel or position of said movable device over said field.

20. In apparatus of the class described, in combination, a member carrying the representation of a field, of contest, a movable device comprising a plurality of electric signals, a hood or relatively translucent material positioned about said signals, a supporting device for said movable device comprising a plurality of relatively rigid current-conducting strands along which said movable device is adapted to travel certain of which of said signals constantly contact, and actuating means operable for causing the translation of said supporting device or the endwise travel of said movable device, said current-conducting indicating strands being adapted to supply current to either of said signals, and switching means for limiting current to certain of said strands whereby either or certain of said signals may become circuited.

21. A game bulletin board, including a ball field representation on the board, an indicator adapted to play over the field, a plurality of guides for the indicator extending across the board, the indicator being slidably mounted on said guides, means for moving the guides and flexible means extending across the board for moving the indicator on said guides.

22. In a game board or bulletin, the combination of a ball field representation, an indicator adapted to move over the field, a supporting member comprising elongated guides extending across the field and mounted upon a suitable support at the rear of the field, the said indicator being slidably mounted upon said guides, and said guides being separated one from the other a sufficient distance to prevent twisting of the indicator, and a flexible connection extending from the indicator to the rear of the field.

23. A game bulletin board, including a ball field representation on the board, an indicator light adapted to play over the field, a plurality of guides for the indicator extending across the board, the indicator being slidably mounted on said guides, means for moving the guides and flexible means extending across the board for moving the indicator on said guides, said guides taking the form of electric conductors operatively associated with said light for operating the same.

24. In a ball bulletin board, the combination of a surface having a field representation, an electric conductor projecting across the field and adapted to be moved relative to the field, an electric indicator positioned on the conductor and movable relative thereto at the front of the field.

25. In a ball bulletin board, the combination of a surface having a field representation, an electric conductor projecting across said field and adapted to be moved relative to the field, an electric indicator positioned on the conductor and movable relative thereto at the front of the field, said indicator comprising a hollow member of transparent material, an electric lamp in said hollow member, and connections between said lamp and conductor within said hollow member.

26. In a ball bulletin board, the combination of a wall having upon the front surface thereof a ball field representation, an electric lamp arranged at the front of the wall, a supporting guide of relatively rigid material extending over the front of the wall, the lamp being operatively connected to said guide, said guide taking the form of an electric conductor for said lamp, and means operable from the rear of the wall for moving said guide to impart movement to the indicator.

27. In a ball bulletin board, the combination of a wall having upon the front surface thereof a ball field representation, an electric lamp arranged at the front of said wall to be moved over said field representation, an inclosing housing for the lamp, said housing being adapted to simulate a ball having an exposed surface adapted to be lighted by said lamp, means for moving said lamp in one direction over the ball field, the said means taking the form of electric conductors, and means operable from the rear of said wall for moving said conductors.

28. In a ball game bulletin board, the combination of a wall having upon the front surface thereof, a ball field representation, an electric lamp at the front of said wall, a translucent inclosure wall for the lamp in the form of a ball, a support extending substantially from one edge of the field to the other, the inclosure wall for the lamp being mounted on the support, the said support taking the form of an electric conductor, and means at the rear of the wall for moving said support.

29. In a ball game bulletin board, the combination of a wall having upon the front surface thereof, a ball field representation, an electric lamp at the front of said wall, a translucent inclosure wall for the lamp in the form of a ball, a support extending substantially from one edge of the field to the other, the inclosure wall for the lamp being slidably mounted on the support, the said support taking the form of an electric conductor and having electric connection with the lamp, and means at the rear of the wall for moving said support and for moving the lamp with the inclosing wall relative to the support.

In testimony whereof I affix my signature, in the presence of two witnesses.

CHARLES H. WILSON.

Witnesses:
C. O. MARKHAM,
H. E. MOORE.